United States Patent
Burghal et al.

(10) Patent No.: US 12,231,200 B2
(45) Date of Patent: Feb. 18, 2025

(54) TECHNIQUES FOR HYBRID BEAMFORMING CODEBOOK EXPANSION BEYOND RADIO FREQUENCY INTEGRATED CIRCUIT MEMORY

(71) Applicant: QUALCOMM Incorporated, San Diego, CA (US)

(72) Inventors: Daoud Abdelhafiz Burghal, San Diego, CA (US); Raghu Narayan Challa, San Diego, CA (US); Vasanthan Raghavan, West Windsor Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 373 days.

(21) Appl. No.: 17/661,142

(22) Filed: Apr. 28, 2022

(65) Prior Publication Data
US 2023/0353203 A1 Nov. 2, 2023

(51) Int. Cl.
H04B 7/06 (2006.01)
H04B 7/0426 (2017.01)

(52) U.S. Cl.
CPC .......... *H04B 7/0617* (2013.01); *H04B 7/043* (2013.01); *H04B 7/0634* (2013.01); *H04B 7/0695* (2013.01)

(58) Field of Classification Search
CPC .... H04B 7/0617; H04B 7/043; H04B 7/0634; H04B 7/0695
See application file for complete search history.

(56) References Cited

U.S. PATENT DOCUMENTS

| | | | |
|---|---|---|---|
| 9,516,602 B2 | 12/2016 | Kim et al. | |
| 2009/0080560 A1* | 3/2009 | Na | H04B 7/0636 375/267 |
| 2010/0260234 A1 | 10/2010 | Thomas et al. | |
| 2011/0105051 A1* | 5/2011 | Thomas | H04L 27/2601 455/69 |
| 2019/0068429 A1 | 2/2019 | Sagi et al. | |
| 2019/0363774 A1 | 11/2019 | Mao | |
| 2020/0195320 A1* | 6/2020 | Raghavan | H04B 7/088 |
| 2021/0385764 A1 | 12/2021 | Pei et al. | |
| 2023/0007666 A1* | 1/2023 | Lim | H04W 72/12 |
| 2023/0170948 A1* | 6/2023 | Han | H04W 52/367 375/267 |

OTHER PUBLICATIONS

International Search Report and Written Opinion—PCT/US2023/017167—ISA/EPO—Jul. 14, 2023.

\* cited by examiner

*Primary Examiner* — Kevin M Cunningham
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may identify a channel matrix of the UE. The UE may identify a set of beam weights according to the channel matrix. The UE may identify a set of beam properties based at least in part on an index, wherein the index is based at least in part on the set of beam weights, and wherein the index is identified without storing the set of beam weights in a long-term memory of the UE. The UE may generate a beam using the set of beam properties. Numerous other aspects are described.

24 Claims, 6 Drawing Sheets

TECHNIQUES FOR HYBRID BEAMFORMING CODEBOOK EXPANSION BEYOND RADIO FREQUENCY INTEGRATED CIRCUIT MEMORY

FIELD OF THE DISCLOSURE

Aspects of the present disclosure generally relate to wireless communication and to techniques and apparatuses for beam codebook expansion.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communications performed by a user equipment (UE). The method may include estimating a covariance matrix corresponding to an effective channel matrix at the UE. The method may include computing a set of beam weights based at least in part on the estimated covariance matrix. The method may include quantizing the set of beam weights and mapping the set of quantized beam weights to an index in a lookup table storing beam properties in a radio frequency integrated circuit (RFIC) memory of the UE. The method may include identifying a set of beam properties based at least in part on the index. The method may include generating a beam for uplink transmissions using the identified set of beam properties.

Some aspects described herein relate to a UE for wireless communication. The user equipment may include a memory and one or more processors coupled to the memory. The one or more processors may be configured to estimate a covariance matrix corresponding to an effective channel matrix at the UE. The one or more processors may be configured to compute a set of beam weights based at least in part on the estimated covariance matrix. The one or more processors may be configured to quantize the set of beam weights and map the quantized set of beam weights to an index in a lookup table storing beam properties in a RFIC memory of the UE. The one or more processors may be configured to identify a set of beam properties based at least in part on the index. The one or more processors may be configured to generate a beam for uplink transmissions using the identified set of beam properties.

Some aspects described herein relate to a non-transitory computer-readable medium that stores a set of instructions for wireless communication by a UE. The set of instructions, when executed by one or more processors of the UE, may cause the UE to estimate a covariance matrix corresponding to an effective channel matrix at the UE. The set of instructions, when executed by one or more processors of the UE, may cause the UE to compute a set of beam weights based at least in part on the estimated covariance matrix. The set of instructions, when executed by one or more processors of the UE, may cause the UE to quantize the set of beam weights and map the quantized set of beam weights to an index in a lookup table storing beam properties in a RFIC memory of the UE. The set of instructions, when executed by one or more processors of the UE, may cause the UE to identify a set of beam properties based at least in part on the index. The set of instructions, when executed by one or more processors of the UE, may cause the UE to generate a beam for uplink transmissions using the identified set of beam properties.

Some aspects described herein relate to an apparatus for wireless communication. The apparatus may include means for estimating a covariance matrix corresponding to an effective channel matrix at the UE. The apparatus may include means for computing a set of beam weights based at least in part on the estimated covariance matrix. The apparatus may include means for quantizing the set of beam weights and mapping the quantized set of beam weights to an index in a lookup table storing beam properties in a RFIC memory of the UE. The apparatus may include means for identifying a set of beam properties based at least in part on the index. The apparatus may include means for generating a beam for uplink transmissions using the identified set of beam properties.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
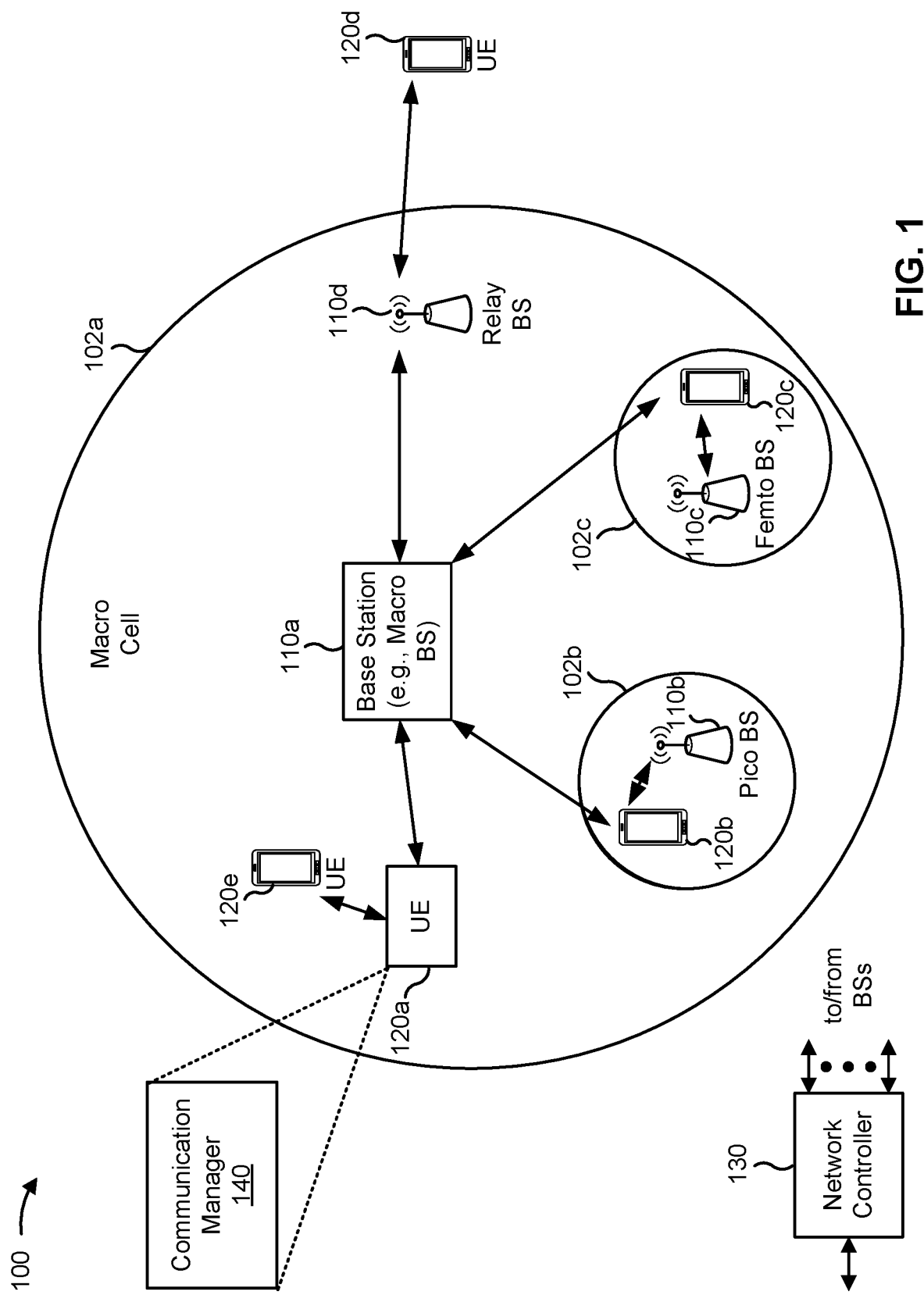
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown)

in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include midband frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may estimate a covariance matrix corresponding to an effective channel matrix at the UE; compute a set of beam weights based at least in part on the estimated covariance matrix; quantize the set of beam weights and map the quantized set of beam weights to an index in a lookup table storing beam properties in a radio frequency integrated circuit (RFIC) memory of the UE; identify a set of beam properties based at least in part on the index; and generate a beam for uplink transmissions using the identified set of beam properties. Additionally, or alternatively, the communication manager 140 may perform one or more other operations described herein.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), TRP, or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more central units (CUs), one or more distributed units (DUs), one or more radio units (RUs), or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

As indicated above, FIG. 1 is provided as an example. Other examples may differ from what is described with regard to FIG. 1.

Figure 2:
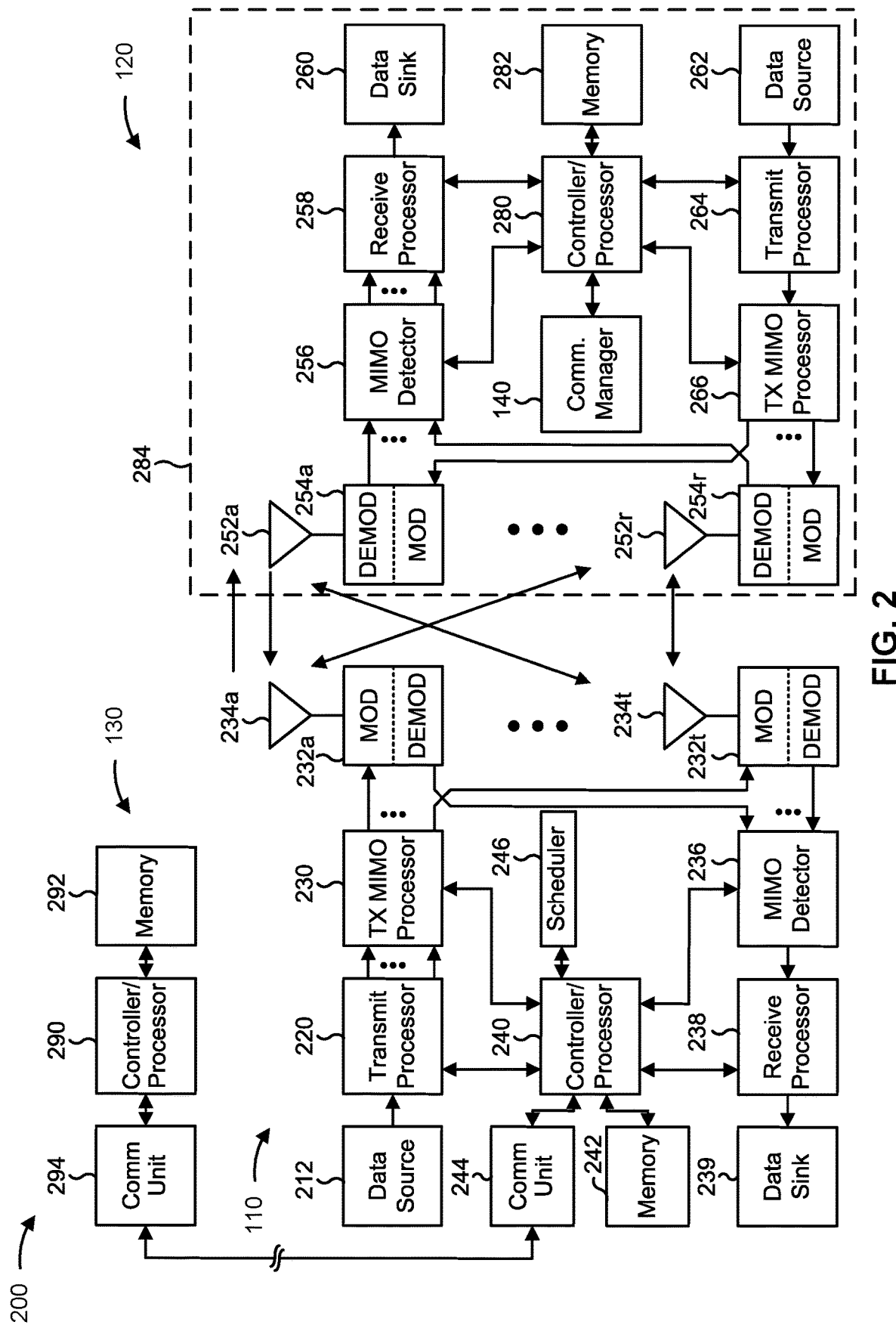
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-6).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-6).

The controller/processor 240 of the base station 110, the controller/processor 280 of the UE 120, and/or any other component(s) of FIG. 2 may perform one or more techniques associated with beamforming, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5 and/or other processes as described herein. In some examples, executing instructions may include running the instructions, converting the instructions, compiling the instructions, and/or interpreting the instructions, among other examples.

In some aspects, the UE 120 includes means for estimating a covariance matrix corresponding to an effective channel matrix at the UE; means for computing a set of beam weights based at least in part on the estimated covariance matrix; means for mapping the set of beam weights to an index in a lookup table storing beam properties in an RFIC memory of the UE; means for identifying a set of beam properties based at least in part on the index; and/or means for generating a beam for uplink transmissions using the identified set of beam properties. The means for the UE 120 to perform operations described herein may include, for example, one or more of communication manager 140, antenna 252, modem 254, MIMO detector 256, receive processor 258, transmit processor 264, TX MIMO processor 266, controller/processor 280, memory 282, or one or more components of FIG. 3, described below.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
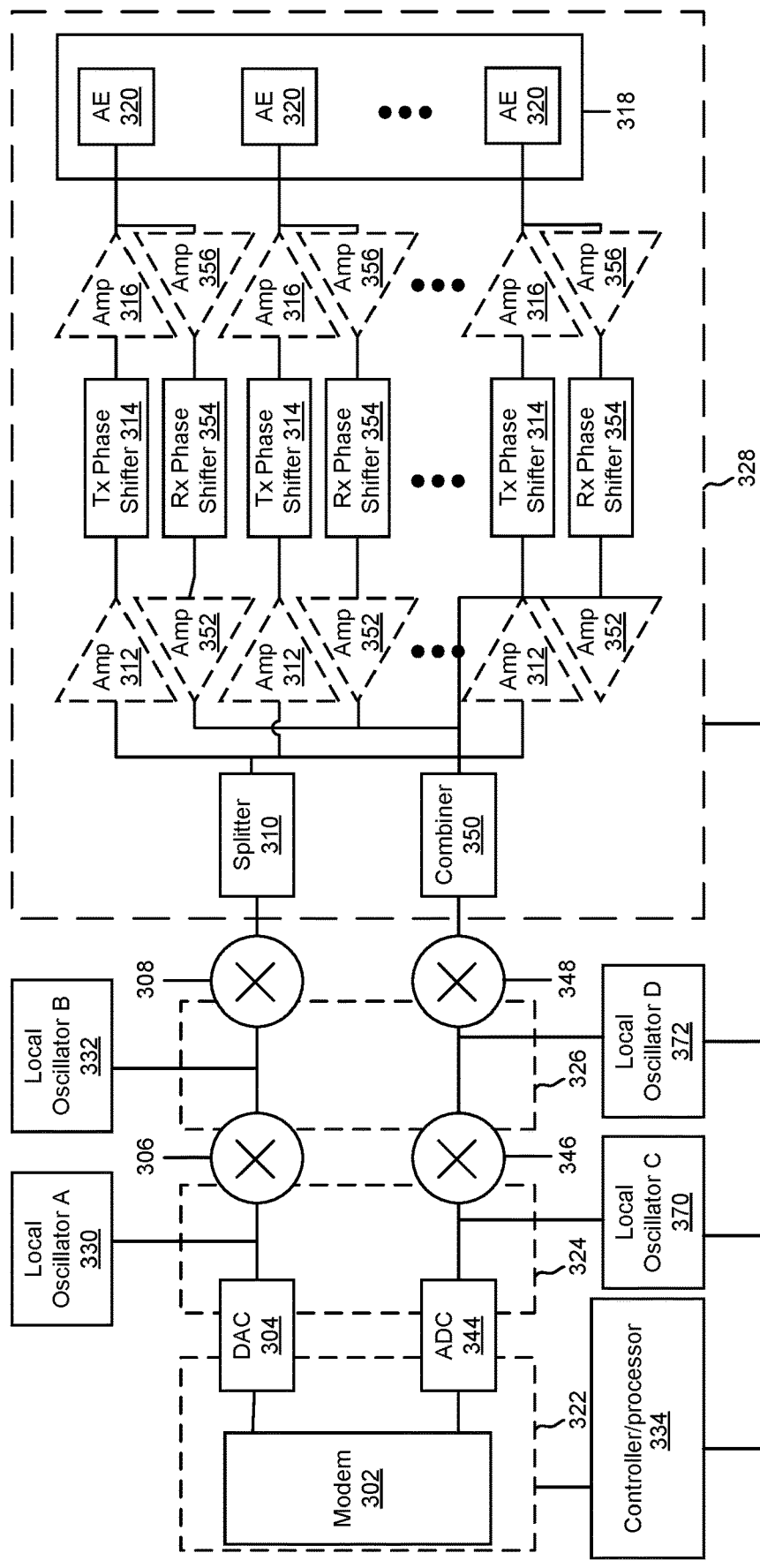
FIG. 3 is a diagram illustrating an example beamforming architecture that supports beamforming for millimeter wave (mmW) communications, in accordance with the present disclosure.

FIG. 3 is a diagram illustrating an example beamforming architecture 300 that supports beamforming for millimeter wave (mmW) communications, in accordance with the present disclosure. In some aspects, architecture 300 may implement aspects of wireless network 100. In some aspects, architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320. In some examples, the modem 302 may be one or more of the modems 232 or modems 254 described in connection with FIG. 2.

Transmission lines or other waveguides, wires, and/or traces are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a controller/processor 334. In some aspects, controller/processor 334 corresponds to controller/processor 240 of the base station described above in connection with FIG. 2 and/or controller/processor 280 of the UE described above in connection with FIG. 2.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306, 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the controller/processor 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312, 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312, 316 are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312, 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312, 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312, 316 may be controlled independently (e.g., by the modem 302 or the controller/processor 334) to provide independent control of the gain for each antenna element 320. For example, the modem 302 and/or the controller/processor 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 and/or the controller/processor 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 and/or the controller/processor 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352, 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to digital signals. The digital signals output from ADC 344 are input to modem 302 for baseband processing, such as decoding, de-interleaving, or similar operations.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312, 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312, 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the controller/processor 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312, 316 of the multiple signals relative to each other. The controller/processor 334 may be located partially or fully within one or more other components of the architecture 300. For example, the controller/processor 334 may be located within the modem 302 in some aspects. In some aspects, the controller/processor 334, or the modem 302, may include, may be, or may communicate with an RFIC, as described below.

As indicated above, FIG. 3 is provided as an example. Other examples may differ from what is described with regard to FIG. 3.

Figure 4:
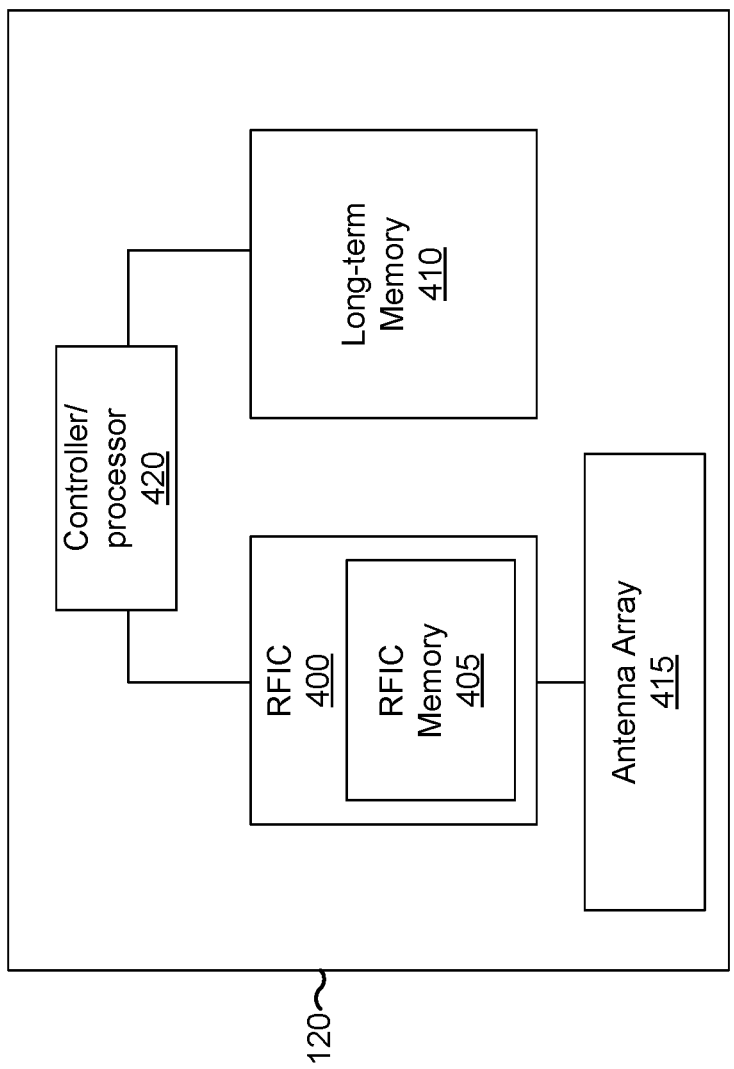
FIG. 4 is a diagram illustrating an example of a UE including a radio frequency integrated circuit, in accordance with the present disclosure.

FIG. 4 is a diagram illustrating an example of a UE 120 including an RFIC 400, in accordance with the present disclosure. An RFIC may be referred to as an RF module. An RFIC 400 is a circuit, such as an application specific integrated circuit (ASIC), that controls RF operation of a system (such as a UE 120 or an antenna panel of the UE 120). In some examples, an RFIC 400 may be packaged with digital signal processing (DSP) functionality, microprocessor control chips, or the like. In some examples, an RFIC 400 may be implemented using a printed circuit board (PCB), a multichip module (MCM), or the like. An RFIC 400 can include analog functions, digital functions, or a combination thereof. In some examples, an RFIC 400 may include a digital interface, a clock synthesizer, an ADC, a DAC, an automatic gain controller (AGC), a low noise amplifier (LNA), a variable gain amplifier (VGA), a power management component, a low pass filter (LPF), a mixer, a power amplifier (PA), or the like.

An RFIC 400 may include or be associated with an RFIC memory 405. A UE 120 may include a long-term memory 410. Long-term memory 410 may be slower than RFIC memory 405. For example, long-term memory 410 may be associated with a lower data rate, a higher latency, or the like. In some aspects, long-term memory 410 may be double data rate (DDR) memory, RAM, an embedded file setting memory, or a combination thereof. Long-term memory 410 may be associated with a larger storage capacity than RFIC memory 405. Therefore, information stored on RFIC memory 405 of RFIC 400 can generally be accessed faster than information stored on long-term memory 410, but less information can be stored on RFIC memory 405 than on long-term memory 410. RFIC memory 405 may be capable of storing, for example, a finite number of sets of beam weights, such as 64-256 sets of beam weights, in some examples.

Static beam weights may be stored in EFS memory and loaded by an RF card (a software module) when the system turns ON to the DDR and the RFIC. Power limits (which may be needed for uplink beam computation) may be stored in EFS and accessed from the EFS to the RFIC. For dynamic beam weights, both weights and power limits may be stored in the EFS. As needed, some subset of the dynamic beam weights and power limits may be loaded to the RFIC memory 405.

In some aspects, RFIC 400 may be associated with antenna array 415 (e.g., antenna array 318). For example, RFIC 400 may control one or more antenna arrays 415. As shown, RFIC 400 and long-term memory 410 may be associated with a controller/processor 420 (e.g., controller/processor 334, modem 302, controller/processor 280). In some other aspects, RFIC 400 may communicate directly with long-term memory 410 (e.g., without the involvement of a separate controller/processor).

The RFIC memory 405 may store information used by the UE 120 to generate beams (e.g., a transmit beam or a receive beam) for communication. For example, the information stored by the RFIC memory 405 may include a codebook that indicates a set of beam weights (sometimes referred to as codeword weights). A beam weight may indicate a phase parameter, an amplitude parameter, or the like, which the UE 120 may use to configure antenna elements of antenna array 415 to generate a desired beam. These beam weights are often designed offline (e.g., while the UE 120 is not in operation) and stored in the RFIC memory 405 at the UE 120. The desired beam may be a serving beam, which is a beam used by the UE 120 for communication. The selection of the serving beam's beam weights, in the online phase (i.e., during operation), may be based at least in part on beam training operations. Such beam training operations are typically a function of the size of the codebook.

Using a predefined codebook may provide a number of advantages, including system simplicity (by eliminating the need for on-the-fly codeword design), reduced memory requirements for small codebooks, and reduced beam training time for small codebooks. However, a static codebook is optimized offline and can be sensitive to factors that may change the characteristic of the antenna elements' electromagnetic (EM) field, such as antenna housing, hand and body-blockage, and a number of channel impairments. Furthermore, the limited storage space of the RFIC memory 405 of the RFIC 400 can lead to a small codebook being predefined with, for example, fewer than 10 possible beams. As a result, there are many scenarios where adaptive or dynamic beam weights beyond the fixed beam weights can provide significant performance improvement. However, using arbitrary beam weights is subject to various challenges due to regulatory constraints on the maximum human exposure to RF energy or radiation. A UE that generates a beam using an arbitrary set of beam weights may violate such regulatory constraints unless an appropriate power backoff is applied. Explicitly defining a codebook that indicates a large number of beam weights and corresponding power backoffs (e.g., all possible combinations of beam weights, a larger number of combinations of beam weights than a static codebook stored by the RFIC memory 405) may use a significant amount of storage space, which may exceed available space of the RFIC memory 405. However, storing such a codebook on the long-term memory 410 may introduce latency in beam management, which may negatively impact beamformed communication of the UE.

Some techniques described herein provide determination of a set of beam weights (which can differ from beam weights indicated by a codebook stored on the RFIC memory 405) and determination of a set of beam parameters (such as a power backoff) based at least in part on an index derived from the set of beam weights. For example, the set of beam weights can be used to determine the index, and the RFIC memory 405 may store information indicating a power backoff corresponding to the index. The UE (e.g., the RFIC 400) may generate a beam using the set of beam weights, and the UE may apply the power backoff corresponding to the index. In this way, the UE can utilize a larger number of possible beams than can be defined by a codebook stored by the RFIC memory 405, which enables optimization of beam parameters (such as beam coverage and gain). Furthermore, by identifying the power backoff corresponding to the index (rather than a power backoff configured as associated with an explicitly configured and stored set of beam weights), the UE can conform with applicable regulations using information stored on the RFIC memory 405.

As indicated above, FIG. 4 is provided as an example. Other examples may differ from what is described with regard to FIG. 4. For example, a UE 120 may include multiple RFICs 400 (e.g., one per antenna panel). Furthermore, the techniques described herein can be implemented at a network node other than a UE 120, such as a base station 110.

Figure 5:
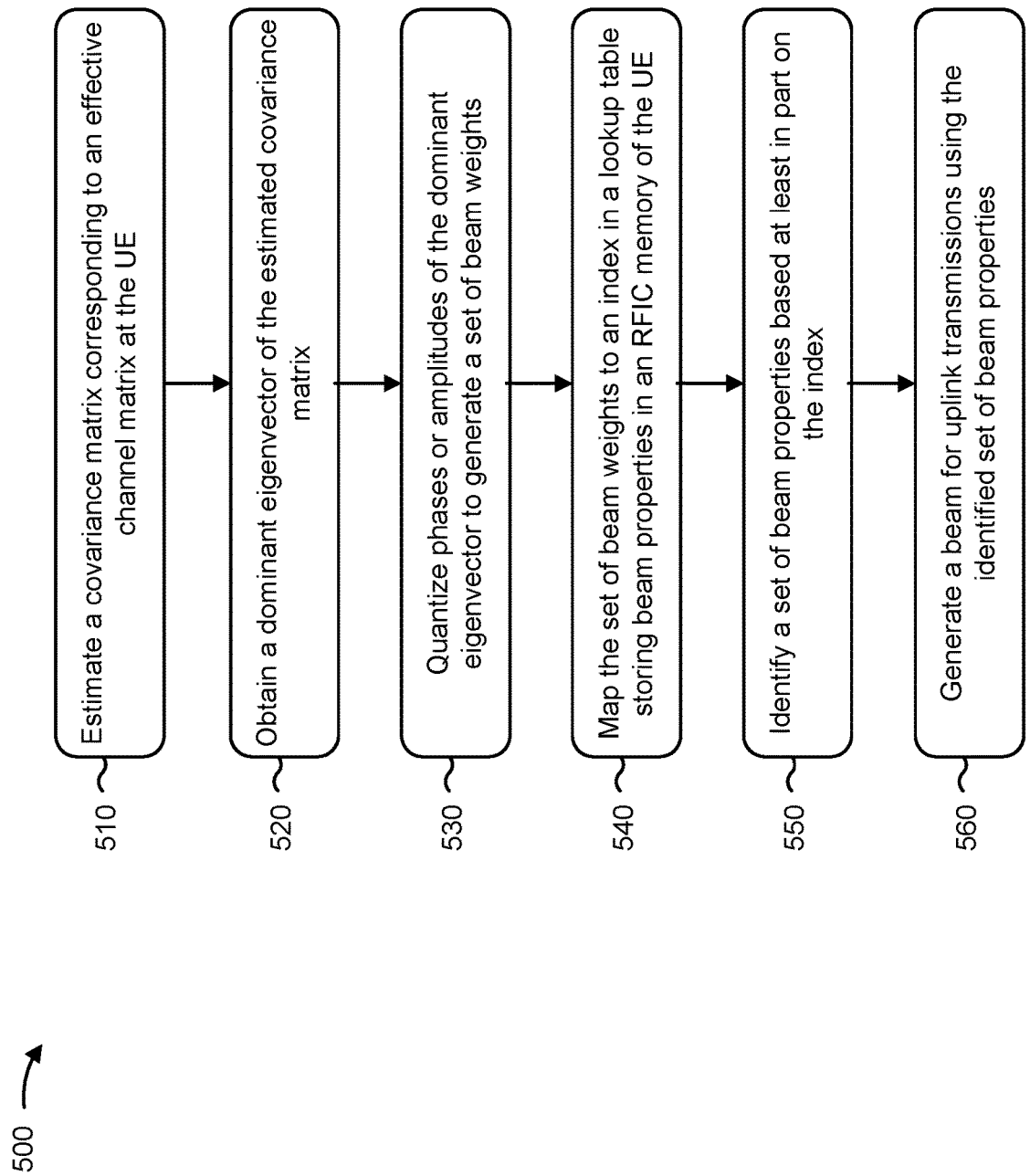
FIG. 5 is a diagram illustrating an example process of wireless communication associated with determination of a set of beam weights and a set of beam parameters, in accordance with the present disclosure.

FIG. 5 is a diagram illustrating an example process 500 of wireless communication associated with determination of a set of beam weights and a set of beam parameters, in accordance with the present disclosure. As shown, example 500 includes a UE (e.g., UE 120) and a base station (e.g., base station 110). The UE may include one or more RFICs (e.g., RFIC 400) corresponding to one or more antenna panels (e.g., antenna array 415, antenna array 318) of the UE. The UE's RFIC(s) may include an RFIC memory (e.g., RFIC memory 405). "Antenna panel" is used interchangeably with "antenna array" herein.

As shown in FIG. 5, in some aspects, process 500 may include estimating a covariance matrix corresponding to an effective channel matrix at the UE (block 510). For example, the UE (e.g., using communication manager 140 and/or estimation component 608, depicted in FIG. 6) may estimate a covariance matrix corresponding to an effective channel matrix at the UE. The effective channel matrix is the channel matrix at the UE's side, which is based at least in part on beamforming at the network node. For example, a channel matrix may have a size Nr×Nt, where Nr is an array dimension at the receiver and Nt is an array dimension at the transmitter. The effective channel matrix is what is seen at the UE side after beamforming with some beam at the gNB side. In some aspects, the UE may estimate the covariance matrix based at least in part on a reference signal, such as a channel state information reference signal (CSI-RS), a synchronization signal block, or the like. In some aspects, the covariance matrix may be referred to as a correlation matrix. The covariance matrix may indicate covariances between elements of a channel matrix. For example, if an antenna array of the UE has 5 antenna elements, the covariance matrix may be a 5×5 matrix that indicates covariances associated with each possible pairing of the 5 antennas, such that relationships between transmitted signals associated with the 5 antennas can be defined. The UE may determine the channel matrix based at least in part on reference signaling, as described above, and may estimate the covariance matrix based at least in part on the channel matrix.

As further shown in FIG. 5, in some aspects, process 500 may include obtaining a dominant eigenvector of the estimated covariance matrix (block 520). For example, the UE (e.g., using communication manager 140 and/or computation component 610, depicted in FIG. 6) may obtain a dominant eigenvector of the estimated covariance matrix. For example, the UE may obtain an eigenvector with a greatest absolute value of all eigenvectors of the estimated covariance matrix. In some aspects, the UE may obtain the dominant eigenvector by solving a characteristic equation associated with the estimated covariance matrix, by using a power method to approximate the dominant eigenvector, or by using another method for obtaining a dominant eigenvector.

As further shown in FIG. 5, in some aspects, process 500 may include quantizing phases or amplitudes of the dominant eigenvector to generate a set of beam weights (block 530). For example, the UE (e.g., using communication manager 140 and/or computation component 610, depicted in FIG. 6) may quantize phases or amplitudes of the dominant eigenvector to generate a set of beam weights. The set of beam weights may be used in hybrid beamforming. "Hybrid beamforming" refers to beamforming that occurs partially in the analog domain (using analog components of the UE, such as a splitter, a phase shifter, or an amplifier) and the digital domain (using digital components of the UE, such as a digital beamforming component or a precoder). In some aspects, the set of beam weights may be determined based at least in part on an adaptive phase shifter. In some aspects, the set of beam weights may be determined based at least in part on a progressive phase shifter. In some aspects, the set of beam weights may be determined based at least in part on an angle of arrival determination and a beam weight selection associated with the angle of arrival determination. Obtaining the dominant eigenvector of the covariance matrix, and quantizing the phases or amplitudes of the dominant eigenvector to generate a set of beam weights, may be collectively referred to as "computing a set of beam weights."

The set of beam weights can include at least one of a phase offset or an amplitude. For example, a set of beam weights used to generate a beam can include a set of phase offsets for a set of antenna elements of an antenna array, and a set of amplitudes associated with the set of antenna elements. The dominant eigenvector may indicate, or be used to determine, a set of unquantized phase offsets. For example, the UE may quantize the dominant eigenvector with phase control to determine a set of quantized phase offsets and may quantize the dominant eigenvector with amplitude control to determine a set of quantized amplitude offsets. The set of quantized phase offsets and the set of quantized amplitude offsets may collectively be referred to as a set of beam weights.

As an example, the set of quantized phase offsets can be determined using a B-bit quantization. If B=3, then a phase offset of an antenna element of an antenna array (relative to a reference antenna element of the antenna array) may be represented by the below vector, where the first (leftmost) column is the quantization in terms of bits and the rightmost column is the quantization in terms of degrees:

$$\begin{bmatrix} 000 & 0 \\ 001 & 45 \\ 010 & 90 \\ 011 & 135 \\ 100 & 180 \\ 101 & 225 \\ 110 & 270 \\ 111 & 315 \end{bmatrix}$$

Thus, a phase offset of 90 degrees can be represented by the bitstring 010. Amplitude can be quantized in a similar fashion (e.g., on a per antenna element basis).

As further shown in FIG. 5, in some aspects, process 500 may include mapping the set of beam weights to an index in a lookup table storing beam properties in an RFIC memory of the UE (block 540). For example, the UE (e.g., using communication manager 140 and/or mapping component 612, depicted in FIG. 6) may map the set of beam weights to an index in a lookup table storing beam properties in an RFIC memory of the UE. In some examples, the UE may map the set of beam weights to the index based at least in part on converting the quantized phase offsets and/or the quantized amplitudes for an antenna array to a decimal value, where the index is the decimal value. As an example, using only a set of quantized phase offsets associated with a five-antenna-element antenna array for simplicity, the set of quantized phase offsets may be [000 010 001 011 101], which may be referred to as a codeword. The first value (000) may have a zero-degree quantized phase offset because the first antenna element of the antenna array is the reference antenna element, and the other values of the set of quantized phase offsets may be relative to the phase of the first antenna element. The set of quantized phase offsets may be converted to a decimal value. For example, a binary string 000010001011101 may be converted to decimals as $1*2^0 + 0*2^1 + 1*2^2 + 1*2^3 + 2^4 + 2^6 + 2^{10} = 1117$. Here, "1117" is the decimal value corresponding to the set of quantized phase offsets and is an index in a lookup table storing beam properties. As mentioned above, the lookup table may be stored in an RFIC memory (e.g., RFIC memory 405) of the UE.

The lookup table may store beam properties. A beam property associated with an index n can be identified by reference to the nth row of the table. In some examples, the lookup table may not explicitly store the indexes. In some aspects, the lookup table may store a beam property for each index (e.g., each beam) that can be derived from the quantized beam weights described above, such as in the example lookup table shown below, where each index is associated with one power backoff:

$$\begin{bmatrix} PB1 \\ PB2 \\ \cdots \\ PB1117 \\ \cdots \end{bmatrix}$$

In some aspects, the lookup table may store a beam property corresponding to multiple indexes (e.g., corresponding to a group of beams), such as in the example lookup table shown below, where one power backoff is associated with multiple indexes:

$$\begin{bmatrix} PB1 \\ \cdots \\ PB1 \\ PB2 \\ \cdots \\ PB2 \end{bmatrix}$$

By configuring the lookup table not to include explicit indications of beam weights (such as explicit phase offset quantizations or explicit amplitude quantizations), the lookup table can be stored on the RFIC memory, which enables usage of the lookup table during operation of the UE. For example, if the lookup table were stored on long-term memory of the UE (such as long-term memory 410), latency associated with accessing the lookup table may be prohibitive to dynamic beamforming on short timeframes. In some aspects, the lookup table may be referred to as a virtual codebook. Thus, the UE may project a raw codeword (that is, unquantized phase offset and/or amplitude values) to a closest codeword of the virtual codebook (that is, an index derived from a set of beam weights determined by quantizing phase offsets and/or amplitude values). In some aspects, the beam parameters of the lookup table may be determined and configured offline. In some other aspects, the beam parameters of the lookup table may be stored by the UE during operation of the UE.

A particular index associated with the lookup table can be used to determine a set of beam weights by converting the decimal value of the index to a binary value that indicates one or more quantized values indicating the set of beam weights.

In some aspects, the UE may determine the set of beam weights using a model. For example, the model may be trained using a machine learning algorithm (e.g., offline). An input to the model may be a raw codeword, and an output of the model may be a set of beam weights and/or an index of the lookup table.

As further shown in FIG. 5, in some aspects, process 500 may include identifying a set of beam properties based at least in part on the index (block 550). For example, the UE (e.g., using communication manager 140 and/or identification component 614, depicted in FIG. 6) may identify a set of beam properties based at least in part on the index, as described above. For an index n, the UE may identify the set of beam properties by reference to the nth row of the lookup table. For example, the lookup table may be a one-column table that indicates a beam property in each row of the lookup table.

As further shown in FIG. 5, in some aspects, process 500 may include generating a beam for uplink transmissions using the identified set of beam properties (block 560). For example, the UE (e.g., using communication manager 140 and/or beamforming component 616, depicted in FIG. 6) may generate a beam for uplink transmissions using the identified set of beam properties, as described above. In some aspects, the UE may cause a beamforming architecture of the UE (as illustrated in FIG. 3) to generate the beam. In some aspects, the beam for uplink transmissions uses the set of beam weights and the identified set of beam properties associated with the index corresponding to the set of beam weights. For example, the UE may generate the beam for uplink transmissions using a set of quantized phase offsets and/or quantized amplitude values as determined at block 530, and the UE may use a power backoff determined at block 550. In some aspects, the UE may apply the power backoff for transmissions using the beam, and the beam is generated using the set of beam weights. In this way, the UE identifies a set of beam weights based at least in part on a dominant eigenvector of the correlation matrix. The UE uses the set of beam weights to identify a power backoff by reference to a lookup table that does not explicitly identify the set of beam weights. Thus, the lookup table is small enough (in terms of data size) to store on the RFIC memory of the UE, which reduces latency associated with beamforming and increases the number of beams that can be generated by the UE without violating regulatory limitations.

As an example, consider a case where the UE has 5 antennas in an antenna array and a 3-bit phase shifter. This example does not include an amplitude component for simplicity. If the UE were to use a codebook that explicitly defines codewords (e.g., sets of beam weights) and power backoffs for each beam that can be generated by the antenna array, then the codebook may explicitly identify $(2^B)^{(5-1)} = 4096$ codewords and power backoffs. This lookup table may be too large to store in many RFIC memories. By omitting the codewords and identifying a row of the lookup table as described above, the size of the lookup table can be reduced such that the lookup table can be stored in many RFIC memories. Furthermore, in this example, increasing the number of beams generatable by the UE (by identifying the set of beam weights using the dominant eigenvector as described above) may provide improved beamforming gain, such as an improvement of approximately 2 dB to 3.5 dB relative to a static codebook that can be used to generate 9 beams.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
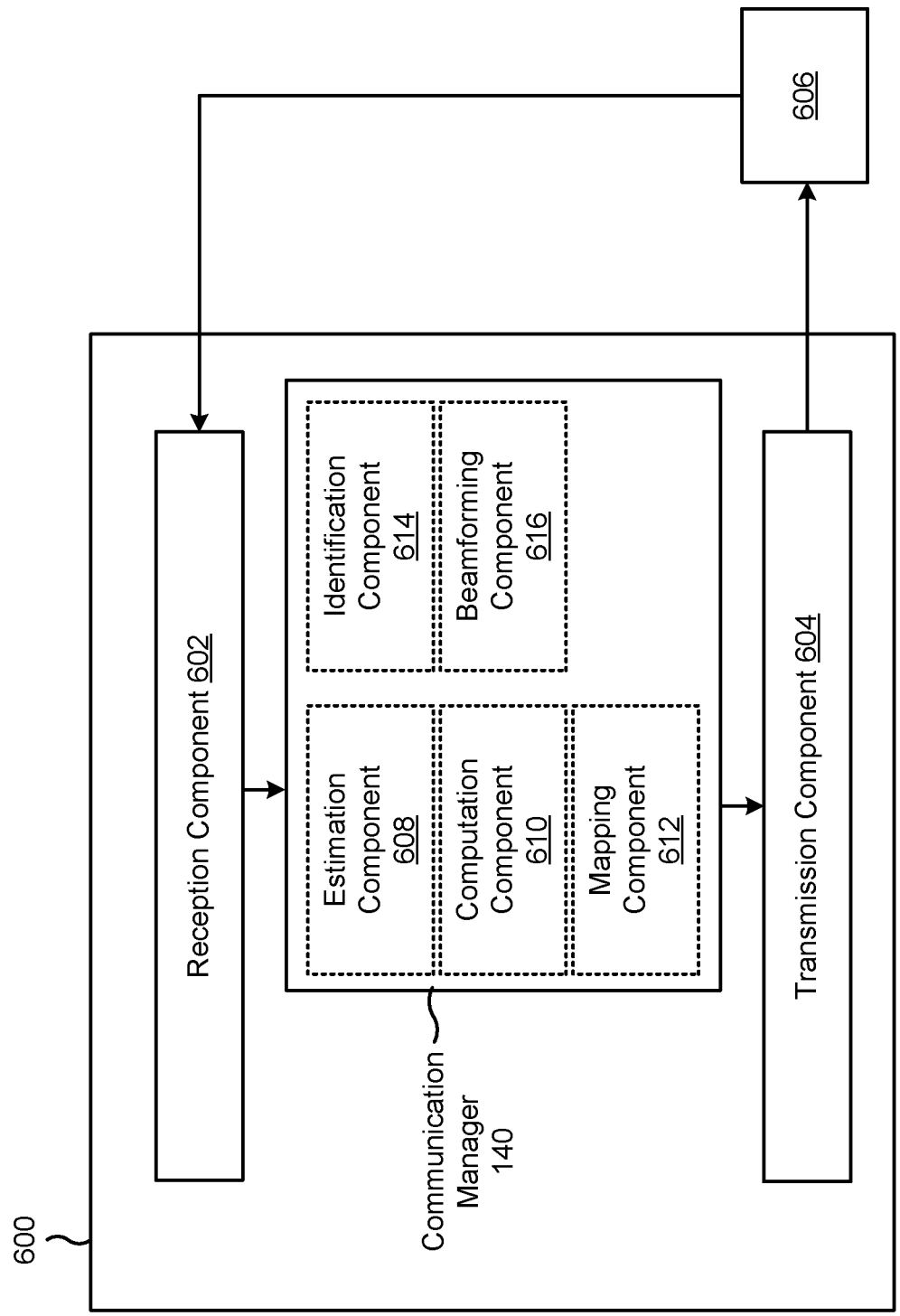
FIG. 6 is a diagram of an example apparatus for wireless communication, in accordance with the present disclosure.

FIG. 6 is a diagram of an example apparatus 600 for wireless communication, in accordance with the present disclosure. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include the communication manager 140. The communication manager 140 may include one or more of an estimation component 608, a computation component 610, a mapping component 612, an identification component 614, or a beamforming component 616, among other examples.

In some aspects, the apparatus 600 may be configured to perform one or more operations described herein in connection with FIGS. 3-4. Additionally, or alternatively, the apparatus 600 may be configured to perform one or more processes described herein, such as process 500 of FIG. 5, or a combination thereof. In some aspects, the apparatus 600 and/or one or more components shown in FIG. 6 may include one or more components of the UE described in connection with FIG. 2. Additionally, or alternatively, one or more components shown in FIG. 6 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 600. In some aspects, the reception component 602 may include one or more antennas, a modem, a demodulator, a MIMO detector, a receive processor, a controller/processor, a memory, or a combination thereof, of the UE described in connection with FIG. 2.

The transmission component 604 may transmit communications, such as reference signals, control information, data communications, or a combination thereof, to the apparatus 606. In some aspects, one or more other components of the apparatus 600 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modem, a modulator, a transmit MIMO processor, a transmit processor, a controller/processor, a memory, or a combination thereof, of the UE described in connection with FIG. 2. In some aspects, the transmission component 604 may be co-located with the reception component 602 in a transceiver.

The estimation component 608 may estimate a covariance matrix corresponding to an effective channel matrix at the UE. The computation component 610 may compute a set of beam weights based at least in part on the estimated covariance matrix. The mapping component 612 may map the set of beam weights to an index in a lookup table storing beam properties in an RFIC memory of the UE. The identification component 614 may identify a set of beam properties based at least in part on the index. The beamforming component 616 may generate a beam for uplink transmissions using the identified set of beam properties.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

The following provides an overview of some Aspects of the present disclosure:

Aspect 1: A method of wireless communications performed by a user equipment (UE), comprising: estimating a covariance matrix corresponding to an effective channel matrix at the UE; computing a set of beam weights based at least in part on the estimated covariance matrix; mapping the set of beam weights to an index in a lookup table storing beam properties in a radio frequency integrated circuit (RFIC) memory of the UE; identifying a set of beam properties based at least in part on the index; and generating a beam for uplink transmissions using the identified set of beam properties.

Aspect 2: The method of Aspect 1, wherein the set of beam weights is to be used in hybrid beamforming.

Aspect 3: The method of any of Aspects 1-2, wherein the beam for uplink transmissions uses the set of beam weights and the identified set of beam properties associated with the index corresponding to the set of beam weights.

Aspect 4: The method of any of Aspects 1-3, wherein the computation of the set of beam weights further comprises: obtaining a dominant eigenvector of the estimated covariance matrix; and quantizing phases or amplitudes of the dominant eigenvector to generate a set of beam weights.

Aspect 5: The method of any of Aspects 1-4, wherein the set of beam properties indicates a power backoff for uplink transmissions with the beam associated with the index.

Aspect 6: The method of Aspect 5, wherein the power backoff is associated with a group of beams including the beam.

Aspect 7: An apparatus for wireless communication at a device, comprising a processor; memory coupled with the processor; and instructions stored in the memory and executable by the processor to cause the apparatus to perform the method of one or more of Aspects 1-6.

Aspect 8: A device for wireless communication, comprising a memory and one or more processors coupled to the memory, the one or more processors configured to perform the method of one or more of Aspects 1-6.

Aspect 9: An apparatus for wireless communication, comprising at least one means for performing the method of one or more of Aspects 1-6.

Aspect 10: A non-transitory computer-readable medium storing code for wireless communication, the code comprising instructions executable by a processor to perform the method of one or more of Aspects 1-6.

Aspect 11: A non-transitory computer-readable medium storing a set of instructions for wireless communication, the set of instructions comprising one or more instructions that, when executed by one or more processors of a device, cause the device to perform the method of one or more of Aspects 1-6.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    estimating a covariance matrix corresponding to an effective channel matrix at the UE;
    computing a set of beam weights based at least in part on the estimated covariance matrix;
    generating a beam for uplink transmissions using the set of beam weights; and
    applying, for transmissions using the beam, a power backoff stored in a row of a lookup table, the row corresponding to an index, the index based at least in part on the set of beam weights, wherein the lookup table is stored in a radio frequency integrated circuit (RFIC) memory of the UE.

2. The method of claim 1, wherein the set of beam weights is to be used in hybrid beamforming.

3. The method of claim 1, wherein the beam for uplink transmissions uses the set of beam weights and a set of beam properties associated with the index.

4. The method of claim 1, wherein the computation of the set of beam weights further comprises:
    obtaining a dominant eigenvector of the estimated covariance matrix; and
    quantizing phases or amplitudes of the dominant eigenvector to generate the set of beam weights.

5. The method of claim 1 further comprising:
    identifying a set of beam properties based at least in part on the index, wherein the set of beam properties indicates the power backoff.

6. The method of claim 1, wherein the power backoff is associated with a group of beams including the beam.

7. A user equipment (UE) for wireless communication, comprising:
    one or more memories; and
    one or more processors, coupled to the one or more memories, configured to:

estimate a covariance matrix corresponding to an effective channel matrix at the UE;

compute a set of beam weights based at least in part on the estimated covariance matrix;

generate a beam for uplink transmissions using the set of beam weights; and applying, for transmissions using the beam, a power backoff stored in a row of a lookup table, the row corresponding to an index, the index based at least in part on the set of beam weights, wherein the lookup table is stored in a radio frequency integrated circuit (RFIC) memory of the UE.

8. The UE of claim 7, wherein the set of beam weights is to be used in hybrid beamforming.

9. The UE of claim 7, wherein the beam for uplink transmissions uses the set of beam weights and a set of beam properties associated with the index.

10. The UE of claim 7, wherein the one or more processors, to compute of the set of beam weights, are configured to:

obtain a dominant eigenvector of the estimated covariance matrix; and quantize phases or amplitudes of the dominant eigenvector to generate the set of beam weights.

11. The UE of claim 7, further comprising:

identifying a set of beam properties based at least in part on the index, wherein the set of beam properties indicates the power backoff.

12. The UE of claim 7, further comprising a beamforming architecture, wherein the one or more processors, to generate the beam, are configured to cause the beamforming architecture to generate the beam.

13. A non-transitory computer-readable medium storing a set of instructions for wireless communication, the set of instructions comprising:

one or more instructions that, when executed by one or more processors of a user equipment (UE), cause the UE to:

estimate a covariance matrix corresponding to an effective channel matrix at the UE;

compute a set of beam weights based at least in part on the estimated covariance matrix; and generate a beam for uplink transmissions using the set of beam weights; and applying, for transmissions using the beam, a power backoff stored in a row of a lookup table, the row corresponding to an index, the index based at least in part on the set of beam weights, wherein the lookup table is stored in a radio frequency integrated circuit (RFIC) memory of the UE.

14. The non-transitory computer-readable medium of claim 13, wherein the set of beam weights is to be used in hybrid beamforming.

15. The non-transitory computer-readable medium of claim 13, wherein the beam for uplink transmissions uses the set of beam weights and a set of beam properties associated with the index.

16. The non-transitory computer-readable medium of claim 13, wherein the one or more instructions, that cause the UE to compute the set of beam weights, further cause the UE to:

obtain a dominant eigenvector of the estimated covariance matrix; and quantize phases or amplitudes of the dominant eigenvector to generate the set of beam weights.

17. The non-transitory computer-readable medium of claim 13, wherein the one or more instructions further cause the UE to:

identify a set of beam properties based at least in part on the index, wherein the set of beam properties indicates the power backoff.

18. The non-transitory computer-readable medium of claim 13, wherein the power backoff is associated with a group of beams including the beam.

19. An apparatus for wireless communication, comprising:

means for estimating a covariance matrix corresponding to an effective channel matrix at the apparatus;

means for computing a set of beam weights based at least in part on the estimated covariance matrix;

means for generating a beam for uplink transmissions using the set of beam weights; and means for applying, for transmissions using the beam, a power backoff stored in a row of a lookup table, the row corresponding to an index, the index based at least in part on the set of beam weights, wherein the lookup table is stored in a radio frequency integrated circuit (RFIC) memory of the apparatus.

20. The apparatus of claim 19, wherein the set of beam weights is to be used in hybrid beamforming.

21. The apparatus of claim 19, wherein the beam for uplink transmissions uses the set of beam weights and a set of beam properties associated with the index.

22. The apparatus of claim 19, wherein the means for computing the set of beam weights further comprises:

means for obtaining a dominant eigenvector of the estimated covariance matrix; and means for quantizing phases or amplitudes of the dominant eigenvector to generate the set of beam weights.

23. The apparatus of claim 19, further comprising:

identifying a set of beam properties based at least in part on the index, wherein the set of beam properties indicates the power backoff.

24. The apparatus of claim 19, wherein the power backoff is associated with a group of beams including the beam.

* * * * *